A. B. McQUEEN.
SPRING TIRE FOR VEHICLE WHEELS.
APPLICATION FILED FEB. 4, 1911.
1,015,451.
Patented Jan. 23, 1912.
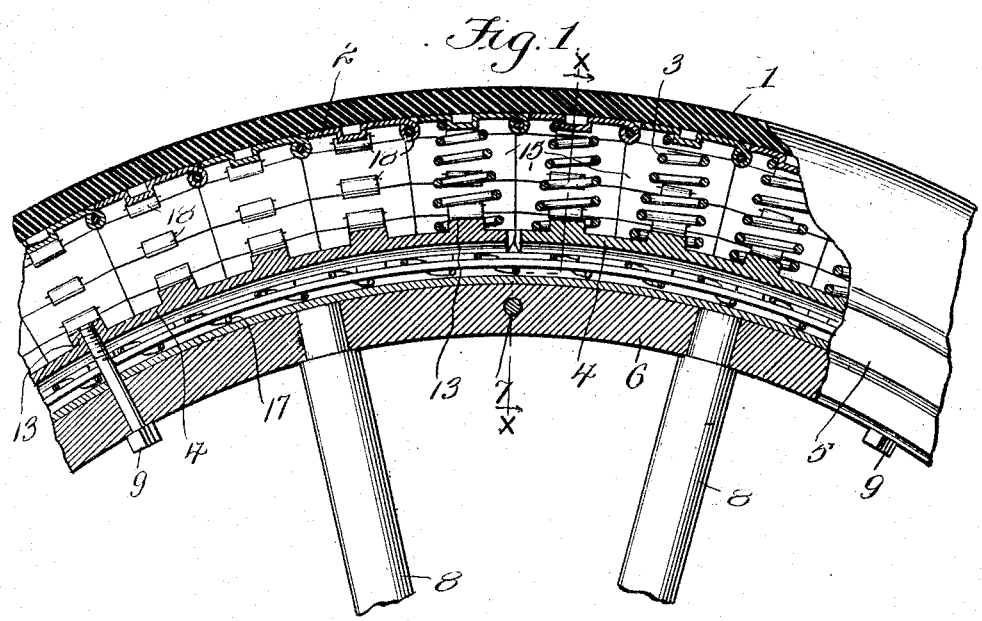
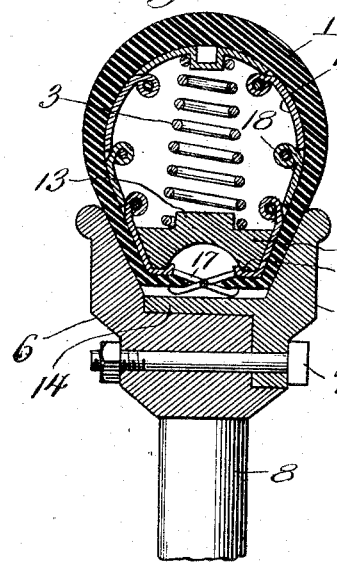
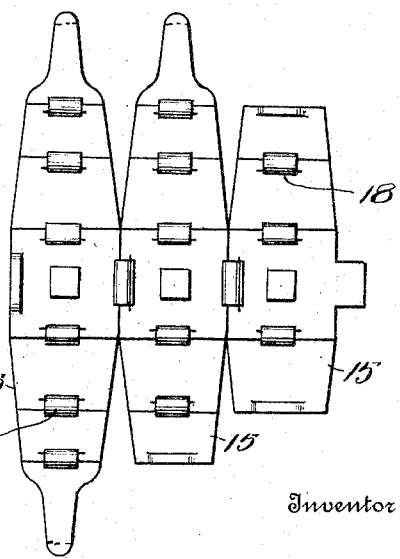
Witnesses
Inventor
Archibald B. McQueen
By Victor J. Evans
Attorney

UNITED STATES PATENT OFFICE.

ARCHIBALD B. McQUEEN, OF DUNNELLON, FLORIDA.

SPRING-TIRE FOR VEHICLE-WHEELS.

1,015,451.  Specification of Letters Patent.  Patented Jan. 23, 1912.

Application filed February 4, 1911. Serial No. 606,553.

*To all whom it may concern:*

Be it known that I, ARCHIBALD B. MCQUEEN, a citizen of the United States, residing at Dunnellon, in the county of Marion and State of Florida, have invented new and useful Improvements in Spring-Tires for Vehicle-Wheels, of which the following is a specification.

The purpose of the present invention is the provision of a yielding tire for vehicle wheels and more particularly for automobiles and mechanically propelled road machines, the purpose being to supply a tire which is resilient to absorb shock and vibration and yet practically puncture-proof, so that a vehicle having its wheels equipped with a set of tires may with impunity be driven over rough roads without danger of placing the machine out of commission by reason of deflation of the tires.

The invention consists of the novel features, details of construction and combination of parts, which hereinafter will be more particularly set forth, illustrated in the accompanying drawing, and pointed out in the appended claim.

Referring to the drawing, forming a part of the specification, Figure 1 shows a portion of the tire partially in central longitudinal section. Fig. 2 is a cross section on the line x—x of Fig. 1. Fig. 3 is a detail view of a portion of the protective casing. Fig. 4 is a detail view of the hinge joint between adjacent sections of the protective casing. Fig. 5 is a sectional view of the parts shown in Fig. 4.

Corresponding and like parts are referred to in the following description, and indicated in all the views of the drawing, by the same reference characters.

The casing of the tire is indicated at 1 and may be of rubber or other flexible material such as is commonly employed in the formation of pneumatic tires. Within the casing 1 is located a protective casing 2, which comprises a plurality of sections, plates or scales hingedly connected and of such formation as to cover the inner walls of the casing 1. A series of coil springs 3 are located within the casing and have a radial arrangement, said springs being approximately of conical form and arranged with their smaller ends pointing outward. A securing ring 4 is provided at intervals in its circumferential length with projections 13, which form seats to receive the inner ends of the springs 3 and hold the latter in place. The securing ring 4 is of wedge form in cross section so as to bind against the ends of the elements comprising the protective casing and hold the same in place. The rim of the wheel comprises two parts 5 and 6, one of which is made detachable to admit of placing the tire in position or removing it from the rim. Bolts 7 connect the parts 5 and 6. The rim may be attached to the spokes 8 in any manner. The detachable member 5 of the rim has an inwardly extending flange 14, which overlaps the inner part of the fixed portion 6 of the rim. The parts 14 and 6 are connected by bolts 9 which pass through openings therein and through the securing ring 4.

The protective casing 2 is formed of a plurality of transverse elements 15 each comprising a number of plates or sections. These transverse elements taper toward opposite ends and the end sections have hooks 12 which engage under projecting edge portions of the securing ring 4 and prevent possible slipping of the parts. The transverse elements are hingedly connected by means of their middle sections so as to sustain the circumferential strain and hold the parts in fixed position. The butts 18 of the hinge joints face inward and have a limited outward movement so as to preserve the cross sectional outline of the tire. The sections or plates of the transverse elements at the sides of the middle plates or sections are disconnected at their edges, but are hinged at their ends so as to sustain the transverse strain and hold the parts in place. The protective casing is of such formation as to practically cover every part of the inner wall of the outer casing 1, thereby preventing any sharp object from penetrating the interior of the tire even though it should pierce the casing 1. The longitudinal edge portions of the casing 1 are inwardly bent and secured by lacing 17. The side flanges of the parts 5 and 6 of the wheel rim have their inner walls outwardly flared and the sides of the securing ring 4 correspondingly flared, thereby securing the edge portions of the casings 1 and 2 by a wedging action.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claim appended hereto.

The hinges connecting the lateral sections admit of the joints moving outward, but limit inward movement. This construction allows compression of the tire when sustaining the load and maintains the normal shape of the tire when the springs 3 are at the limit of their movement.

Having thus described the invention what is claimed as new, is:—

In combination a vehicle wheel rim having outer flanges, a flexible casing, a second casing arranged within the flexible casing and comprising a plurality of metal plates hingedly connected to one another, the metal plates having inner projections, a securing ring for confining the casings to the rim and having outer projections, and conical springs arranged between the securing ring and the outer portion of the inner casing and having their ends fitted to the projections of the said securing ring and the inner casing.

In testimony whereof I affix my signature in presence of two witnesses.

ARCHIBALD B. McQUEEN.

Witnesses:
M. RULEIM,
J. M. BARKSDALE.